United States Patent
Podrazka et al.

(10) Patent No.: US 12,511,519 B2
(45) Date of Patent: Dec. 30, 2025

(54) CANDIDATE DATA POINTS SELECTION SYSTEM FOR LABELING UNLABELED DATA POINTS

(71) Applicant: Bank of America Corporation, Charlotte, NC (US)

(72) Inventors: Melissa Podrazka, Chicago, IL (US); Justin Horowitz, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 555 days.

(21) Appl. No.: 18/092,493

(22) Filed: Jan. 3, 2023

(65) Prior Publication Data

US 2024/0220767 A1    Jul. 4, 2024

(51) Int. Cl.
*G06N 3/04* (2023.01)
*G06F 18/21* (2023.01)
*G06F 18/214* (2023.01)
*G06F 18/22* (2023.01)
*G06N 3/045* (2023.01)
*G06N 3/09* (2023.01)

(52) U.S. Cl.
CPC ........... *G06N 3/04* (2013.01); *G06F 18/2155* (2023.01); *G06F 18/217* (2023.01); *G06F 18/22* (2023.01); *G06N 3/045* (2023.01); *G06N 3/09* (2023.01)

(58) Field of Classification Search
CPC ........ G06N 20/00; G06N 20/10; G06N 20/20; G06N 3/02; G06N 3/04; G06N 3/042; G06N 3/045; G06N 3/0495; G06N 3/0895; G06N 3/09; G06N 3/091; G06N 3/092; G06F 18/2155; G06F 18/217; G06F 18/22
See application file for complete search history.

(56) References Cited

U.S. PATENT DOCUMENTS

| | | | |
|---|---|---|---|
| 2018/0333063 A1* | 11/2018 | Muchhala | G01R 33/0354 |
| 2019/0035113 A1* | 1/2019 | Salvi | G06N 3/084 |
| 2020/0279411 A1* | 9/2020 | Atria | G06T 11/006 |

OTHER PUBLICATIONS

U.S. Appl. No. 17/541,428, filed Dec. 3, 2021, U.S. Appl. No. 17/883,784, filed Aug. 9, 2022, U.S. Appl. No. 17/887,641, filed Aug. 15, 2022, U.S. Appl. No. 18/135,819, filed Apr. 18, 2023 and U.S. Appl. No. 17/818,603, filed Aug. 9, 2022.

(Continued)

*Primary Examiner* — Shane D Woolwine
(74) *Attorney, Agent, or Firm* — Weiss & Arons LLP (57) ABSTRACT

A method for candidate data points selection for labeling unlabeled data points is provided. The method may include inputting a first data point to an auditable neural network. The method may include predicting, using the network, a label for the first data point. The method may include deconstructing, based on a simplicial structure, the first data point into a plurality of component parts of the first data point. The method may include reconstructing, the first data point into a reconstructed first data point, based on the simplicial structure, using the plurality of component parts and the label. The method may include generating a reconstruction error value based on a reconstruction error algorithm that compares the first data point to the reconstructed first data point. The method may include quarantining the first data point within the auditable neural network when the reconstruction error value is above a threshold reconstruction error value.

20 Claims, 8 Drawing Sheets

(56) References Cited

OTHER PUBLICATIONS

Roberts et al., "The Principles of Deep Learning Theory," https://arxiv.org/pdf/2106.10165.pdf, Aug. 24, 2021.
"AlphaGo," *AlphaGo—Wikipedia*, Wikimedia Foundation, Inc., Sep. 14, 2022.
"Simultaneous Localization and Mapping," *Simultaneous localization and mapping—Wikipedia*, Wikimedia Foundation, Inc., Nov. 8, 2022.
"Thompson Sampling," *Thompson sampling—Wikipedia*, Wikimedia Foundation, Inc., Nov. 10, 2022.

* cited by examiner

CANDIDATE DATA POINTS SELECTION SYSTEM FOR LABELING UNLABELED DATA POINTS

CROSS-REFERENCE TO RELATED APPLICATIONS

Co-pending, commonly assigned U.S. patent application Ser. No. 17/818,603, entitled "GRADIENT BOOSTED SIMPLEX-BASED NEURAL NETWORK", filed on Aug. 9, 2022, co-pending, commonly assigned U.S. patent application Ser. No. 17/883,784, entitled "AI-BASED SELECTION USING CASCADED MODEL EXPLANATIONS", filed on Aug. 9, 2022 and co-pending, commonly assigned U.S. patent application Ser. No. 17/887,641, entitled "AI-BASED PATTERN IDENTIFICATION TRANSFORMER", filed on Aug. 15, 2022, each of the foregoing which is hereby incorporated by reference herein, in their respective entireties.

FIELD OF TECHNOLOGY

Aspects of the disclosure relate to artificial intelligence. Specifically, aspects of the disclosure relate to labeling data to be used in artificial intelligence networks.

BACKGROUND OF THE DISCLOSURE

In the field of machine learning, supervised machine learning algorithms rely on correctly labeled training data to prime the models. The training data should be labeled accurately in order for the supervised algorithms to learn patterns within the data. Specifically, the supervised algorithms learn patterns based on the calculation of error between the ground truth output label (which may be assigned by a human or received as part of labeled training data set) and the model's predicted output label. The model may compare its predicted output to the label. The difference between the prediction and the truth may be the error margin with the model. At times, the prediction and the truth may be equivalent. As such, the calculated error may be zero—i.e., no error.

In certain industries, ground truth output labels may be relatively cheap and easy to obtain. Therefore, when creating machine learning models, an enterprise may prime a model with a large number of labeled data points (at times, including millions of labeled data elements). After a large amount of training data is used to generate a model, the algorithms are tuned such that the neurons within an artificial neural network are re-weighted in an attempt to reduce the error margin. The tuned model is used to label new incoming unlabeled data points. The model may require continuous re-tuning and re-weighting to decrease the error margin. This process of priming a model with large amounts of labeled training data may be computing-resource cost effective for enterprises that encounter large amount of low-resource-consumptive-labeled training data in their ordinary course of business. Examples of such enterprise may include social media forums, which may continually receive either likes or dislikes to posts, such that a model may be able to predict whether a person or group would like or dislike a particular post.

However, with regards to selected environments where the risk of a false positive or a false negative is of great impact, there may not be a large amount of readily-available training data. Further, in such environments, another solution may be desirable. The solution may require smaller amounts of training data to accurately tune a model.

An example of an environment where the risk of a false positive or a false negative is of great impact may be a mission critical environment. An exemplary mission critical environment may involve an entity with a large number of financial accounts. Each of the financial accounts may include a relatively large number of activities. A small subset of the activities may be malicious activities. It may be of great impact to the entity to identify true positives—i.e., the subset of malicious activity—in order to stop the malicious activity and/or prevent future such malicious activity. It may also be of great impact not to identify false positives—i.e., not to incorrectly identify activities that correspond to appropriate activities as malicious—because a false accusation may be harmful and costly to the entity.

In the above example, it may be relatively simple to label non-malicious activities because of the large number of non-malicious activities. However, because the number of malicious activities may be very small compared to the non-malicious activities and because it may be highly computing-resource consumptive to label malicious activities because each malicious activity may be unique, there may not be sufficient labeled data to prime an effective machine learning model. This may be specifically important in mission critical environments which cannot afford a more than a minimal error rate because of the detriment associated with false positives or positives not identified by the system.

Traditionally, in machine learning systems, the above-mentioned problem—i.e., reducing the amount of labeled data required to prime an accurate model—was solved by a number of methods. The methods include preprocessing the data to label unlabeled data elements.

Such preprocessing methods include imputation. Imputation may be understood to refer to assignment of value—i.e., a label—to an object—i.e., an unlabeled data element—by inference from the value of the products or processes to which it contributes.

Other methods include dimensionality reduction processes (reducing the number of features that define a label (what defines an object, such as a truck, a duck or a malicious activity)), whereby autoencoders (unsupervised neural networks that receive large amounts of unlabeled data elements to identify a reduced number of features within a plurality of data points), principal component analysis (PCA) (PCA is a machine learning model that simplifies the complexity in high-dimensional data while retaining trends and patterns by transforming the data into fewer dimensions) and feature selection techniques (which select important features or components from data) use unlabeled data to reduce the amount of labeled data needed to prime a model. However, although these methods may use unlabeled data to reduce the required amount of labeled data, when the percentage of missing labels within a data set is greater than a threshold percentage, manual labeling at least a percentage of the missing labels is required to maintain a level of accuracy.

It should be noted that the cost of labeling the data may be very high in some mission critical environments. In one example, the cost of labeling a data point may include up to 100 full time employee (FTE) hours of a senior employee and associated computing resources.

Therefore, it would be desirable for a machine learning system that is able to select candidate data points for labeling a collection of data points, label the candidate data point and learn from each selected candidate data point, as opposed to learning from random data points.

SUMMARY OF THE DISCLOSURE

A machine learning system that works to identify anomalous data points is provided.

The machine learning system may identify anomalous data points within a plurality of data points (it is important that the system may only pull anomalous data points and does not pull non-anomalous data points otherwise it would take large amounts of time and resources to sift through the data points).

How does the machine learning system identify anomalous data points? It compares each data point to a set of expectations. If the data point matches the set of expectations, then the data point is non-anomalous. If the data point does not match the set of expectations, then the system returns stating that the anomalous data point does not match expectations. The anomalous data point may be sent to a human analyst for review.

The human analyst may review the anomalous data point. The human analyst may label the anomalous data point. A communication, indicating whether the data point is labeled as anomalous or non-anomalous may be transmitted back to the machine learning system. The machine learning system then creates a neuron (within an artificial neural network) that corresponds to the new data point. The neuron identifies the data point as either anomalous or non-anomalous. As such, the artificial neural network is primed to identify similar behavior (as identified by the neuron) of future data points.

It should be noted that each neuron within the network may be traceable. As such, the artificial neural network may be an auditable artificial neural network, with each neuron within the artificial neural network preferably being tied to, or generated from, a specific experience (data point).

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for creating an auditable neural network is provided. Methods may include receiving a first unlabeled data point at the auditable neural network. The first unlabeled data point may correspond to a first set of activities.

Methods may also include deconstructing the first unlabeled data point into a plurality of data elements. Methods may include reconstructing the first set of activities from the plurality of data elements. The deconstruction and/or the reconstruction may be executed at the neural network. The deconstruction and/or the reconstruction may be executed at a module operating in tandem with the neural network. The deconstruction and/or the reconstruction may be based on a simplicial structure.

Methods may include executing a first reconstruction error algorithm. The first reconstruction error algorithm may compare the reconstructed first set of activities to the first set of activities. Methods may include generating a first reconstruction error value from the execution of the first reconstruction error algorithm. The first reconstruction error algorithm may be a root mean square error algorithm, such as equation A, shown below. The y(i) may be each activity within the first set of activities. The ŷ(i) may be each activity within the reconstructed first set of activities. N may be a number of activities within the first set of activities.

$$RMSE = \sqrt{\sum_{i=1}^{N} \|y(i) - \hat{y}(i)\|^2 / N} \qquad \text{Equation A}$$

At times, methods may include predicting the first label for the first set of activities. The first label may be used in the reconstruction of the first set of activities.

Methods may include identifying that the first reconstruction error value is higher than a threshold reconstruction error. Upon identification that the first reconstruction error value is higher than the threshold reconstruction error, methods may include quarantining the first data point for identification.

Quarantining the first data point may be understood to refer to separating the first data point from the neural network. Quarantining the first data point may ensure that the neural network will not attempt to learn from an anomalous data point.

Methods may include receiving a first label for the first set of activities—i.e., the quarantined data point. The first label may be benign or malicious. The first label may be any other suitable label. At times, upon receipt of the label for the first data point, the first data point may be unquarantined. Methods may include creating a first neuron within the neural network. The first neuron may correspond to the first set of activities. The first neuron may be labeled with the first label.

Methods may include receiving a second unlabeled data point. The second unlabeled data point may correspond to a second set of activities. Methods may include deconstructing the second unlabeled data point into a second plurality of data elements. Methods may include reconstructing the second set of activities from the second plurality of data elements. The deconstruction and/or the reconstruction may be executed at the neural network. The deconstruction and/or the reconstruction may be executed at a module operating in tandem with the neural network. The deconstruction and/or the reconstruction may be based on a simplicial structure.

Methods may include executing a second reconstruction error algorithm. The second reconstruction error algorithm may compare the reconstructed second set of activities to the second set of activities. Methods may include generating a second reconstruction error value based on the second reconstruction error algorithm. The second reconstruction error algorithm may be a root mean square error algorithm, such as equation A, shown earlier in the disclosure. The y(i) may be each activity within the second set of activities. The ў(i) may be each activity within the reconstructed second set of activities. N may be a number of activities within the second set of activities.

At times, methods may include predicting the first label for the second set of activities. The first label may be used in the reconstruction of the second set of activities.

Methods may include identifying that the second reconstruction error value is higher than a threshold reconstruction error. Upon identification that there is a higher than the threshold reconstruction error within the reconstructed second set of activities, methods may include quarantining the second data point for identification.

Methods may include receiving a second label for the second set of activities. The second label may be benign or malicious. The second label may be any other suitable label. Methods may include creating a second neuron within the neural network. The second neuron may correspond to the second set of activities. The second neuron may be labeled with the second label.

Methods may include receiving a third unlabeled data point. The third unlabeled data point may correspond to the third set of activities. Methods may include using the auditable neural network to determine if the third unlabeled data point is labelable by the neural network. The determination may include deconstruction the third unlabeled data point into its component parts using a simplicial structure. The determination may include labeling the third unlabeled data point with a third label based on the component parts. The third label may be benign or malicious. The third label may be any other suitable label.

The determination may include reconstructing the third unlabeled data point from the component parts using the simplicial structure. The reconstruction may utilize a third reconstruction error algorithm. The third reconstruction error algorithm may be a root mean square error algorithm, such as equation A, shown earlier in the disclosure. The y(i) may be each activity within the third set of activities. The ў(i) may be each activity within the reconstructed third set of activities. N may be a number of activities within the third set of activities.

The determination may include calculating a third reconstruction error between the third unlabeled data point and the reconstructed third unlabeled data point. The determination may include quarantining the third unlabeled data point within the auditable neural network when the reconstruction error is greater than a predetermined threshold.

When the third reconstruction error is greater than, or less than, the predetermined threshold and the third label is malicious, methods may include creating a neuron, within the neural network, that corresponds to the third data point. When the third reconstruction error is less than the predetermined threshold and the third label is benign, methods may include completing processing the third data point at the auditable neural network.

A system for candidate data point selection for labeling unlabeled data points may include an auditable neural network. The auditable neural network may reside on a hardware processor coupled to a hardware memory.

The auditable neural network may include a series of algorithms used to recognize underlying relationships in one or more data points through a plurality of weighted neurons arranged in a plurality of layers. Each layer, included in the plurality of layers, may include an activation function acting on a linear transformation of data points in the network. Each neuron within the network represents an inputted data point in terms of the inputted data point's independent and dependent variables.

The auditable neural network may receive a first data point. The auditable neural network may predict a label for the first data point.

The auditable neural network may deconstruct, based on a simplicial structure, the first data point into a plurality of component parts. The auditable neural network may reconstruct the first data point into a reconstructed first data point based on the simplicial structure using the plurality of component parts and the label.

The auditable neural network may calculate a reconstruction error value based on a residual between the first data point and the reconstructed first data point. The auditable neural network may quarantine the first data point when the reconstruction error value s above a threshold reconstruction error value.

In some embodiments, the first data point may be a financial account, the label may be benign or malicious and the plurality of component parts may be transactions.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
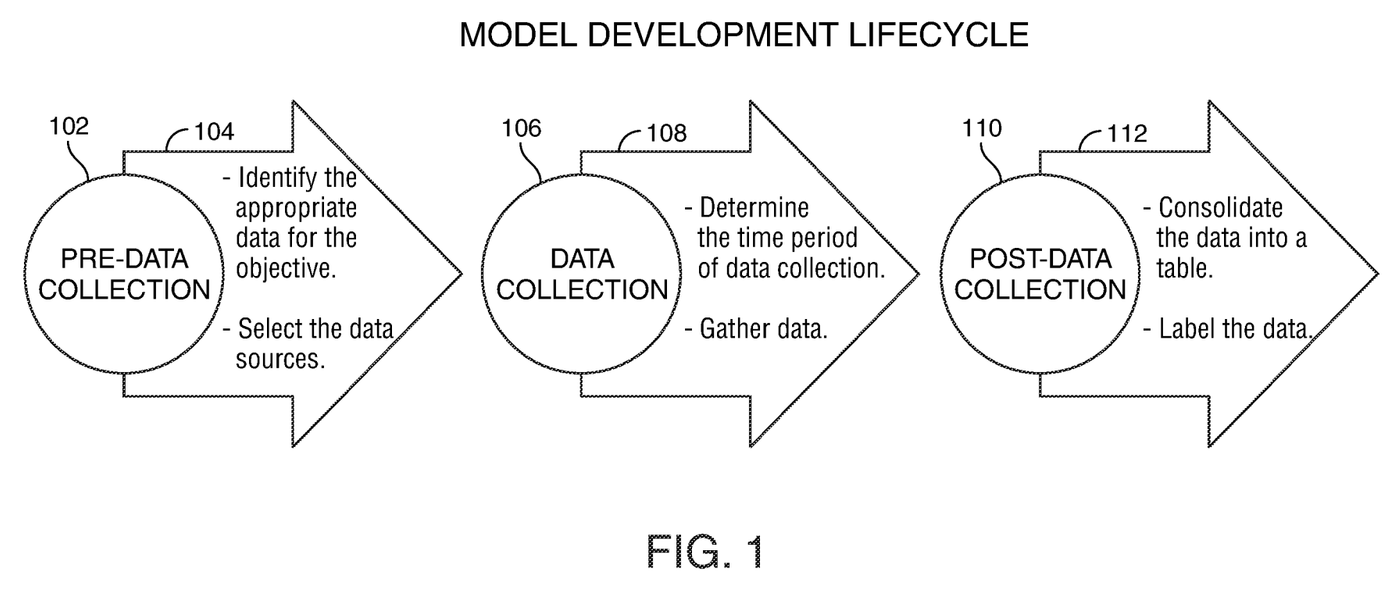
FIG. 1 shows an illustrative diagram in accordance with principles of the disclosure.

FIG. 1 shows an illustrative diagram. The illustrative diagram shows a model development lifecycle. The model development lifecycle may include stages in the lifecycle of an artificially-intelligent model for selecting data points for labeling. The model development lifecycle may be a horizontal process, in which a first step is followed by a second step, which is then followed by a third step, etc. The model development lifecycle may also be a circular process, in which a first step is followed by a second step, which is then followed by a third step, which may be followed by the first step.

The steps shown in the model development lifecycle may include pre-data collection 102, data collection 106 and post-data collection 110.

Pre-data collection 102 may include identifying the appropriate data for the objective, as shown at 104. Identifying the appropriate data may include determining a data set that appropriately matches the objective. For example, if an objective of the model is to identify fraudulent activities/transactions within bank accounts, the appropriate data my include historic bank activities/transactions.

Pre-data collection 102 may include selecting the data source, also shown at 104. At times, there may be large amounts of appropriate data. Therefore, selecting the data source may include selecting a subset of the appropriate data. The selection of the subset may be determined by identifying which data, included in the data sources, may be most appropriate for the objective. For example, a subset of a data set may be data that is structured in a technical format that is easily digestible by the model.

Data collection 106 may include determining the time period of data collection, as shown at 108. Determining the time period of data collection may involve identifying a start time and an end time for data collection. Determining the time period of data collection may also involve identifying a time window, such as an amount of time, for, e.g., three hours, within a predetermined time period, for, e.g., twenty-four hours. Once a time period of data collection is established, the data is gathered from the appropriate data sources during the time period scheduled for data collection.

Post-data collection 110 may include consolidating the data into a table, as shown at 112. Consolidating the data into a table may include structuring the data into a format. The format may enable a computer and/or an operator to label the data. Labeling data may be understood to refer to assigning a tag to a data point, or data set. The assigned tag may be selected from a collection of tags. An example of labeling data may include receiving a plurality of animal pictures. Each of the animal pictures may be labeled with the name of the animal portrayed in the picture.

Figure 2:
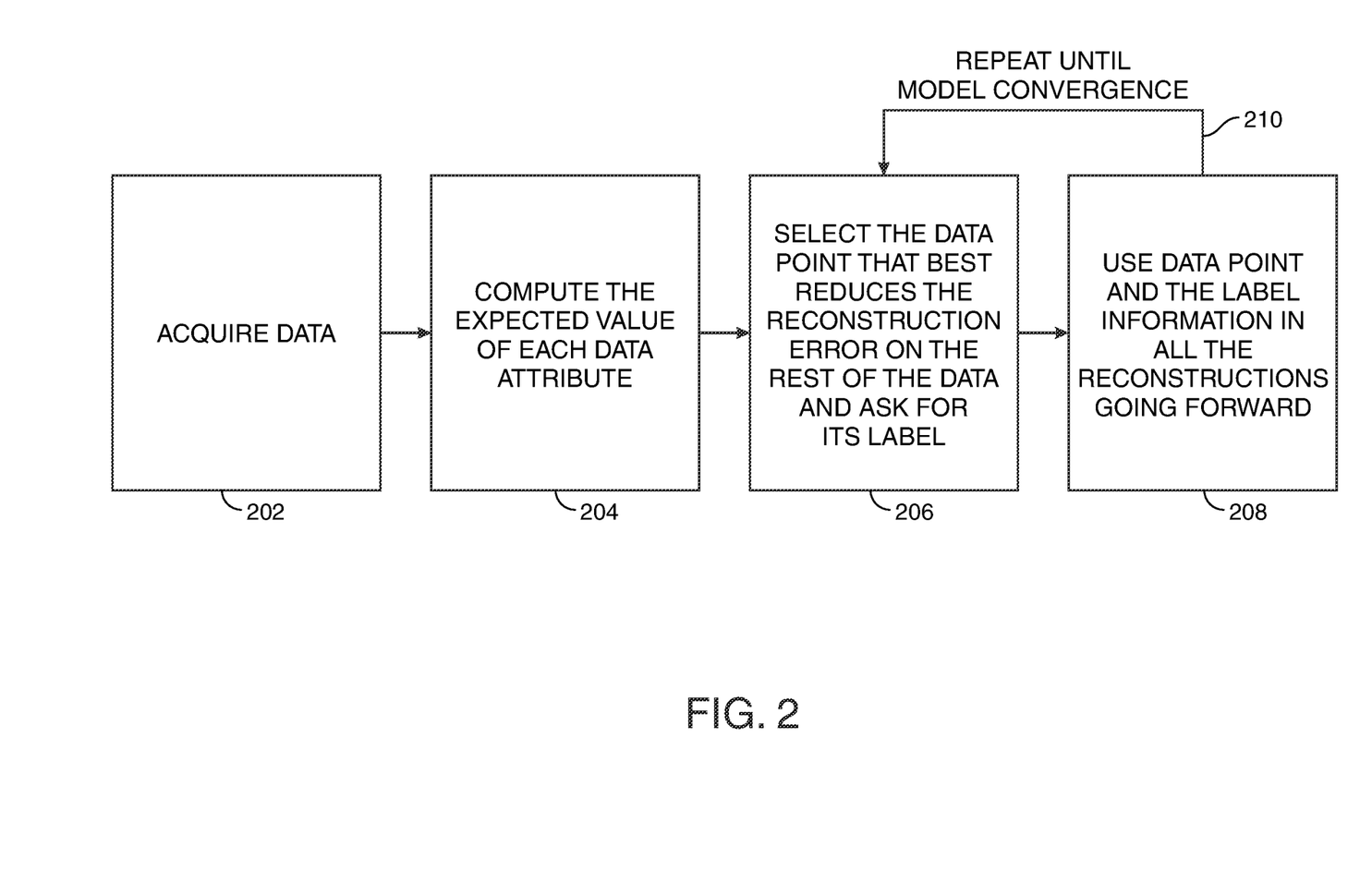
FIG. 2 shows an illustrative flow chart in accordance with principles of the disclosure.

FIG. 2 shows an illustrative flow chart. The illustrative flow chart shows a high-level overview of a process for identifying data points where the model does not understand the data. Furthermore, the illustrative flow chart describes labeling the identified data points based on the identification process.

The process may include the following steps: A first step may include executing an action. A second step may include continuing the action if the error of the action is within a reasonable error margin (also referred to as "do nothing"). A third step may include learning something from the action if the error of the action is outside of a reasonable error margin.

The process may use labeled data to generate a neural network. The neural network, using the labeled data, may generate a prediction of an unlabeled data point. The process may also perform data reconstruction in addition to prediction. Data reconstruction may be understood to refer to receiving a data file, such as an image, deconstructing the data file into component parts (at times, one or more of the component parts may be identified) and reconstructing the data file using the component parts.

At times, one or more of the component parts may not be used in the reconstruction. For example, if a data file is a picture of a face, the data file may be deconstructed into component parts. The component parts may include facial features, such as a nose, a mouth, eyes, and ears. The component parts may also include accessories, such as glasses and earrings. As such, the data reconstruction may reconstruct the data file with or without one or more of the accessories.

The high-level overview shown in FIG. 2 includes steps 202, 204, 206 and 208.

Step 202 shows acquiring data. Data may be acquired by fetching the data from a data source, receiving the data in a data stream or any other suitable process.

Step 204 shows computing the expected value of each data attribute. This step may be executed by a neural network. This step may include data deconstruction and data reconstruction. Each data element may be deconstructed into a plurality of data components, also referred to as attributes. Each data attribute may be assigned an initial value. The initial value may correspond to the value of the data attribute within the data element. Each of the data attributes may be used to reconstruct the data element. During the reconstruction process, the process may compute an expected value of each data attribute. The expected value of each data attribute may be understood to refer to the value of the data attribute within the reconstructed data element. The difference between the initial value and the expected value may be the reconstruction error, for that data attribute, on the part of the model.

The reconstruction error may be a numerical value. A larger numerical value may indicate a greater difference between the initial value and the expected value. Therefore, a larger numerical value may indicate a greater reconstruction error. A smaller numerical value may indicate a smaller difference between the initial value and the expected value. Therefore, a smaller numerical value may indicate a smaller reconstruction error.

Each reconstruction error of each data attribute within the model may be combined. The combination of each reconstruction error of each data attribute within the model may be referred to herein as the total reconstruction error of the model. Data attributes with greater reconstruction error may contribute more to the total reconstruction error, while data attributes with smaller reconstruction error may contribute less to the total reconstruction error. As such, to reduce the total reconstruction error of the model, data attributes with greater reconstruction error should be selected for further processing.

Step 206 shows selecting the data point that best reduces the reconstruction error on the rest of the data and ask for its label. The data point that best reduces the reconstruction error may be the data point with the greatest reconstruction error. The data point may be presented to an operator. The operator may manually label the data point. The newly labeled data point may be reprocessed within the model. At times, a new neuron may be generated for the data point. The new neuron may be added to the model, which may also be referred to as a neural network.

Step 208 shows using the data point and the label information in all the reconstructions going forward. Once the data point and the label information has been converted into a neuron, and the neuron is added to the model/neural network, the neuron may be used to reconstruct future data points.

Steps 206 and 208 may be repeated until model convergence, as shown at 210. A machine learning or artificially intelligent model may reach convergence when it achieves a state during training in which loss settles to within a predetermined error range around the final value. As such, a model converges when additional training data does not improve the model. Model convergence is discussed in greater detail in connection with FIG. 4.

Figure 3:
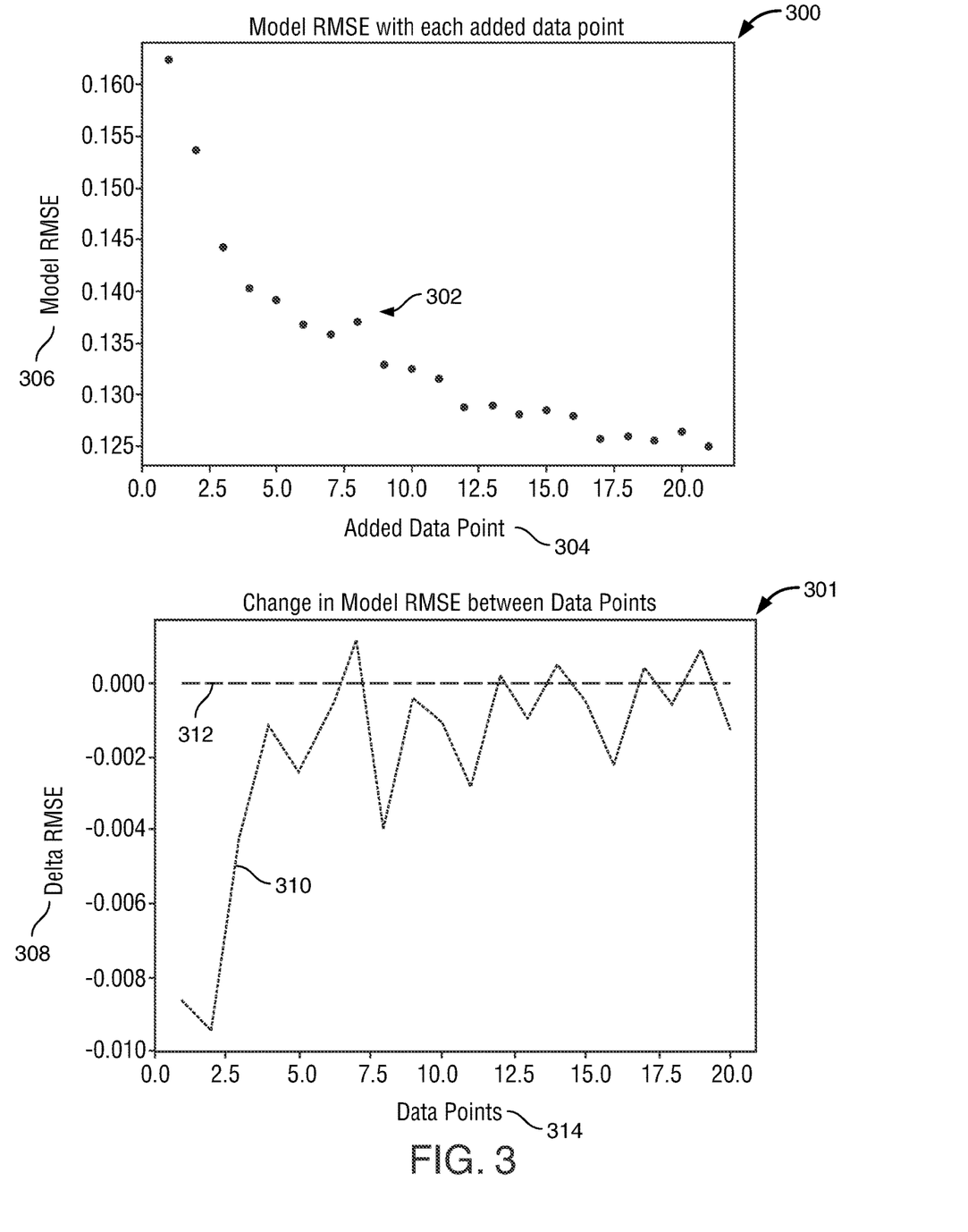
FIG. 3 shows illustrative graphs in accordance with principles of the disclosure.

FIG. 3 shows illustrative graphs 300 and 301. Illustrative graphs 300 and 301 show model performance utilizing reconstruction error. Both graphs 300 and 301 indicate the reconstruction error of data points. The formula used to calculate the reconstruction error in both graphs 300 and 301 may be root mean square error ("RMSE"). In alternative embodiments, reconstruction error may be calculated using a different formula.

RMSE shows how far a predicted value falls from a true value, using Euclidean distance. RMSE is calculated by the following: calculating the residual (difference between the predicted value and the true value) for each data point, computing the norm of the residual for each data point, computing the mean of the residuals and taking the square root of the mean.

The formula to find RMSE is shown as Equation A, also shown below. In Equation A, N is the number of data points, y(i) is the ith measurement (the true value) and y̌(i) is the corresponding predicted value.

$$RMSE = \sqrt{\sum_{i=1}^{N} \|y(i) - \breve{y}(i)\|^2 / N} \quad \text{Equation A}$$

Graph 300 shows a model's (or neural network's) RMSE with each added data point. The y-axis on the graph shows a model RMSE, as shown at 306. The x-axis on the graph shows each added data point, as shown at 304. Each point on the graph, indicated by exemplary arrow 302, signifies a data point. With most of the data points added to the neural network, the RMSE, or the reconstruction error, is lowered. Therefore, most labeled data points should reduce the reconstruction error of the model.

Between around data points 17 and 20, graph 300 shows model convergence. As such, the additional data points may not increase the accuracy of the model.

Graph 301 shows the change in model RMSE between data points. The y-axis shows the delta RMSE, or the difference between RMSE from one data point to another data point. The x-axis shows the data points, as indicated at 314. Line 310 shows the change in model RMSE between data points. Line 312 shows a threshold for change between data points. In graph 301, the threshold for change may be 0.000. When the model RMSE is at or about the zero threshold, the model may have little or no reconstruction error. When the model RMSE is considerably less (or less than a predetermined threshold) than the zero threshold, the total reconstruction error may be higher.

It should be noted that, as seen in graph 301, the larger number of data points the higher the likelihood the model includes points of contradiction. Points of contradiction may be indicated by steep slopes (either upward or downward) within the graph.

Figure 4:
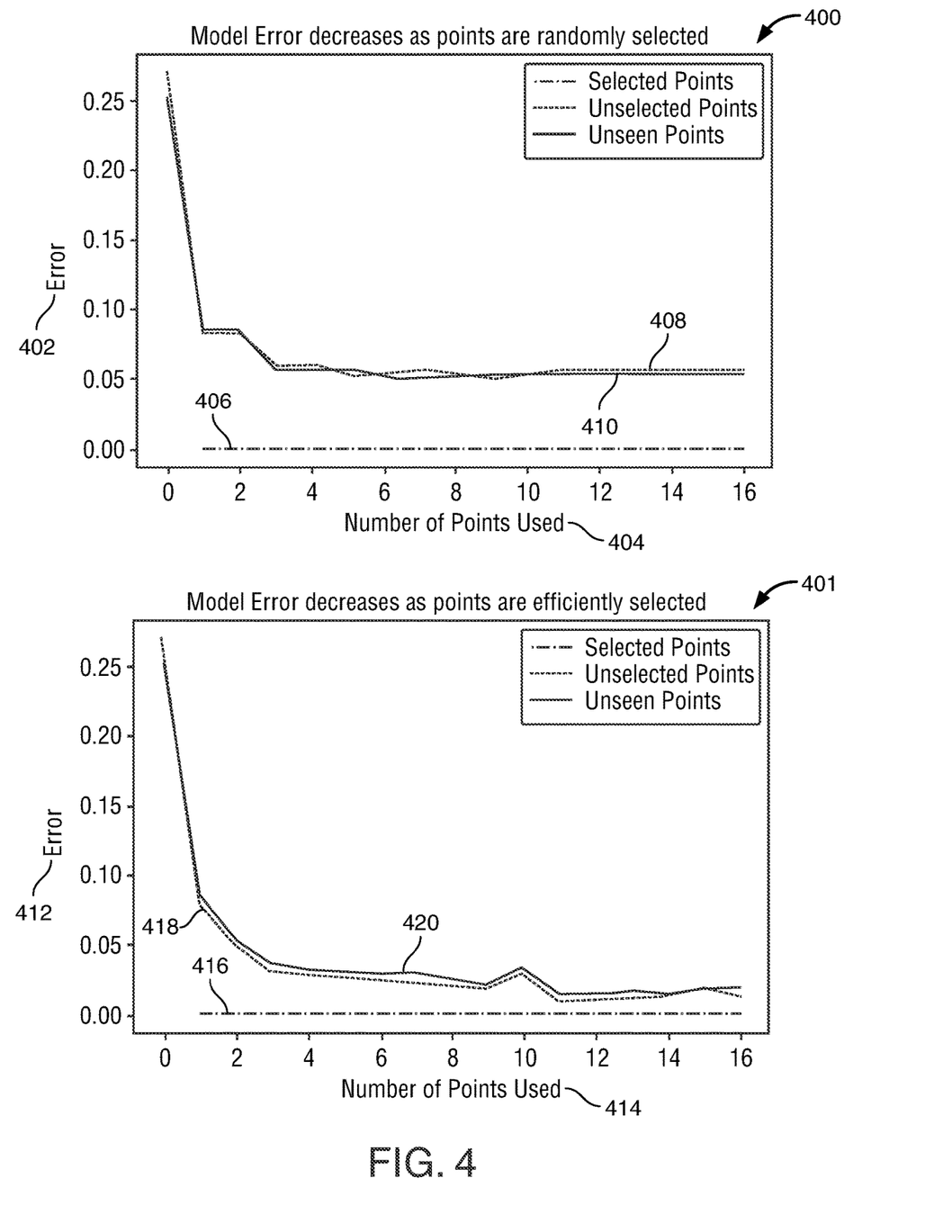
FIG. 4 also shows illustrative graphs in accordance with principles of the disclosure.

FIG. 4 shows illustrative graphs. Illustrative graphs 400 and 401 show a comparison between the model error of points that are randomly selected and points that are efficiently selected. Efficient selection of data points may include identifying data points with high reconstruction error, transmitting the identified data points to an operator, receiving a label from an operator regarding the identified data points and creating a neuron that corresponds to each data point with high reconstruction error.

A model may reach convergence when it achieves a state in which loss settles to within an error range around the final value. As such, a model converges when additional training data does not improve the model. Model convergence may be achieved when additional data elements fail to improve the error rate of the model.

Graph 400 shows that model error decreases as points are randomly selected. The model using randomly selected points may achieve model convergence at around an error rate of 0.05. Graph 401 shows that the model error decreases as points are efficiently selected. The model using efficiently selected points may achieve model convergence at around an error rate of 0.02. As such, a model that is built upon efficiently selected points may achieve a smaller error rate than a model that is built upon randomly selected points.

The model may preferably use as few data points as possible. This may conserve computing time and resource used in data labeling. Model performance may be influenced by model input. As such, the model may be improved with each added data point. Using processes in co-pending, commonly assigned U.S. patent application Ser. No. 17/883,784, the model may detect when a new labeled data point does not improve the reconstruction error. As such, a neuron may be discarded and/or not generated for each data point that does not improve reconstruction error.

In graph 400, error may be shown on the y-axis, as indicated at 402. The number of points used may be shown on the x-axis, as indicated at 404. Selected points may be shown at 406, unselected points may be shown at 408 and unseen points may be shown at 410.

In graph 401, error may be shown on the y-axis, as indicated at 412. The number of points used may be shown on the x-axis, as indicated at 414. Selected points may be shown at 416, unselected points may be shown at 418 and unseen points may be shown at 420.

Figure 5:
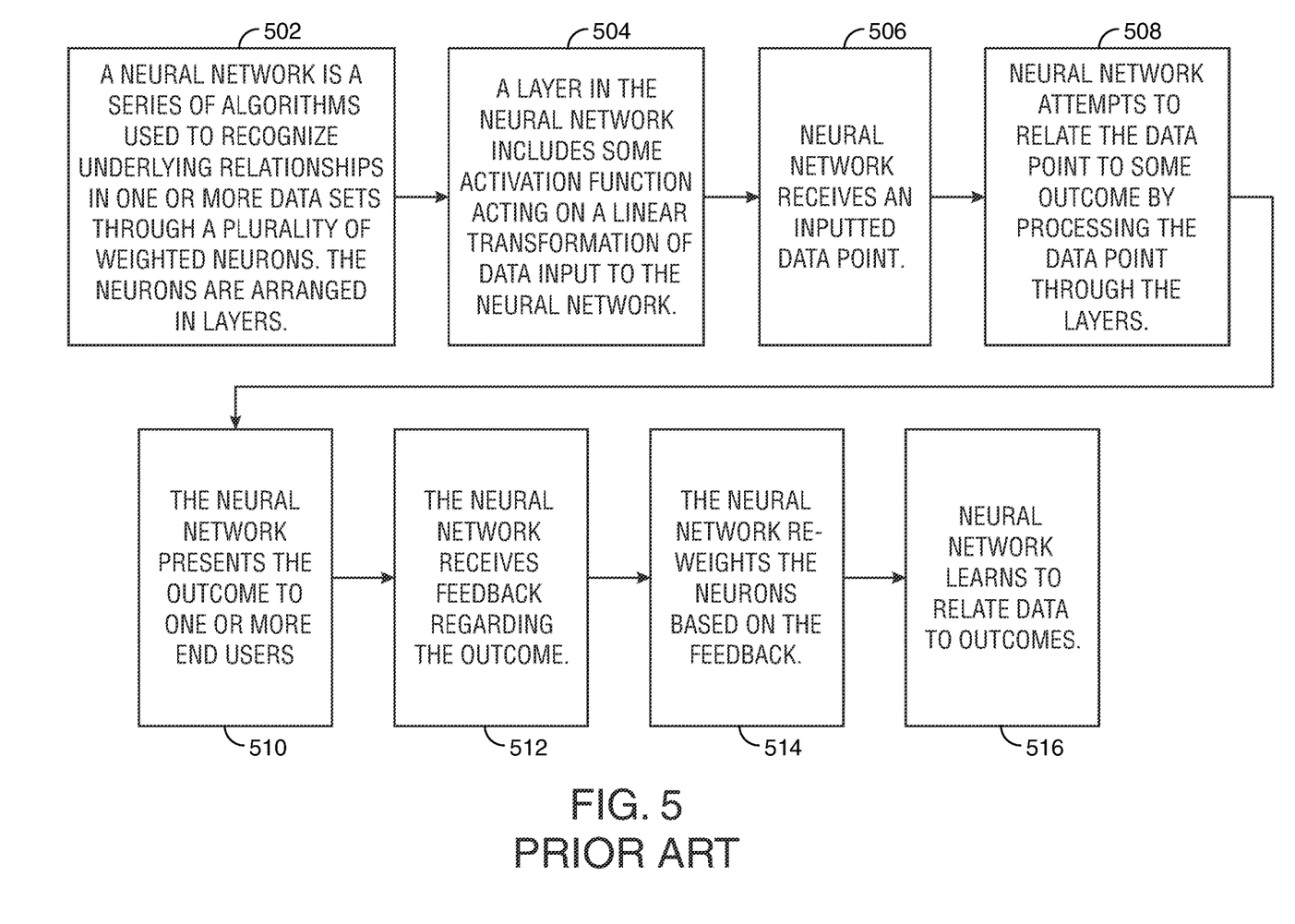
FIG. 5 shows an illustrative prior art flow chart.

FIG. 5 shows an illustrative prior art flow chart. The illustrative prior art flow chart shows processing of data using prior art neural networks.

Step 502 shows a neural network is a series of algorithms used to recognize underlying relationships in one or more data sets through a plurality of weighted neurons. The neurons are arranged in layers. Step 504 shows that a layer in the neural network includes some activation function acting on a linear transformation of data input into the neural network.

Step 506 shows the neural network receives an inputted data point. Steps 508 shows that the neural network attempts to relate the data point to some outcome by processing the data point through the layers.

Step 510 shows the neural network presents the outcome to one or more end users. Step 512 shows the neural network receives feedback regarding the outcome. Step 514 shows that the neural network re-weights the neurons based on the feedback. Step 516 shows that the neural network learns to relate data to outcomes.

Steps 506 through 516 may be repeated and the neural network may learn from each inputted data point.

Figure 6:
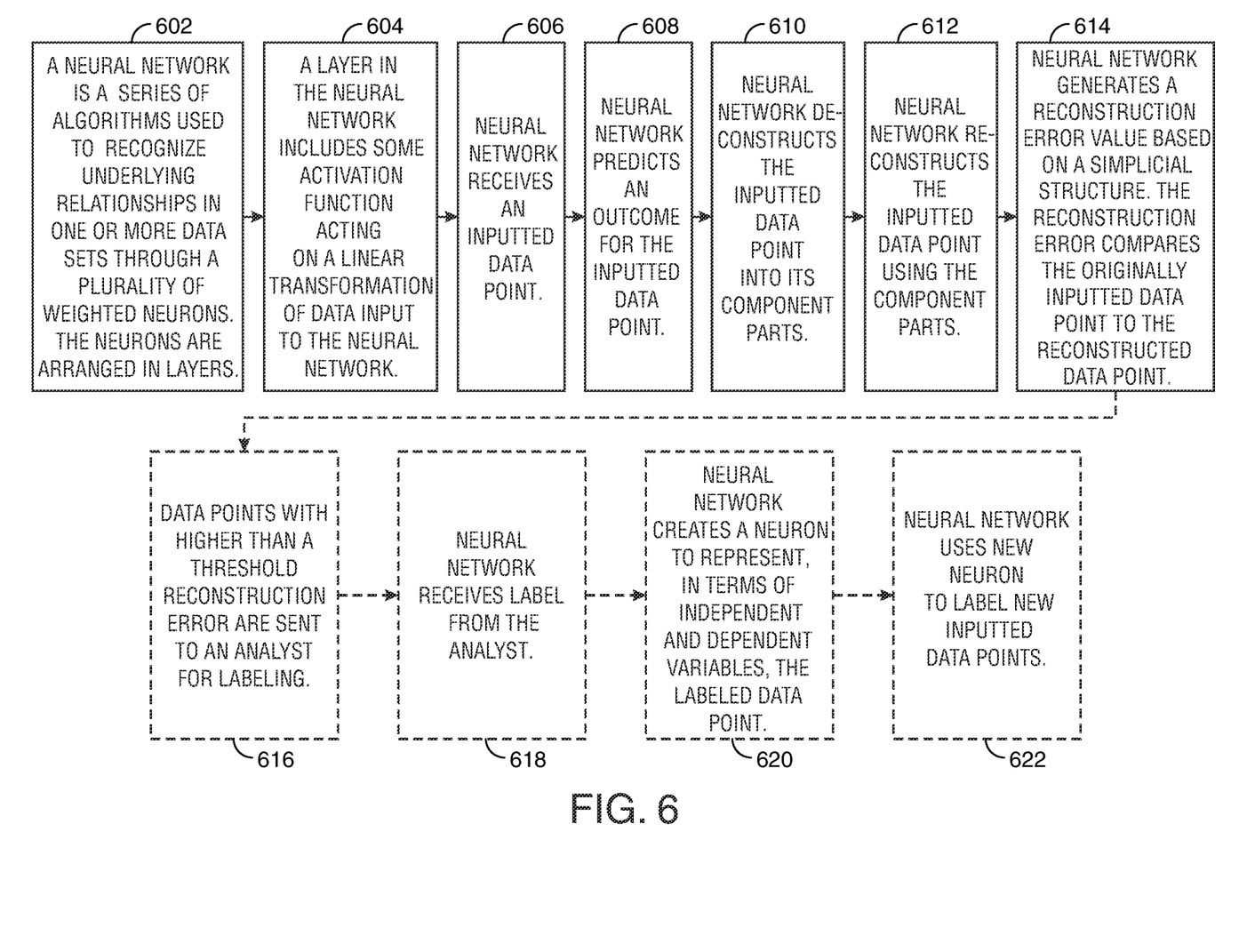
FIG. 6 shows an illustrative flow chart in accordance with principles of the disclosure.

FIG. 6 shows an illustrative flow chart. The illustrative flow chart shows an illustrative process in accordance with principles of the disclosure.

Step 602 shows that a neural network is a series of algorithms used to recognize underlying relationships in one or more data sets through a plurality of weighted neurons. The neurons are arranged in layers. Step 604 shows a layer in the neural network includes some activation function acting on a linear transformation of data input into the neural network.

Step 606 shows the neural network receives an inputted data. Step 608 shows the neural network predicts an outcome for the inputted data point.

Step 610 shows the neural network deconstructs the inputted data point into its component parts. Step 612 shows the neural network reconstructs the inputted data point using the component parts. At times, the reconstruction may utilize the label (or outcome) predicted by the network at step 608. The deconstruction and/or reconstruction may also utilize a simplicial structure.

Step 614 shows the neural network generates a reconstruction error value based on a simplicial structure. The reconstruction error value may identify a comparison between the originally inputted data point and the reconstructed data points. Data points with greater than a threshold reconstruction error may be selected as data points that the neural network does not understand, and therefore cannot be categorized or labeled.

Steps 616 through 622 may include processing the selected data points. It should be noted that steps 616 may be optional within the process. Step 616 shows data points with higher than a threshold reconstruction error are sent to an analyst for labeling. Step 618 shows that the neural network receives a label for each of the data points with higher than a threshold reconstruction error. Step 620 shows that the neural network creates a neuron to represent, in terms of independent and dependent variables, each newly labeled data point. Step 622 shows the neural network uses the new neurons to label new inputted data points.

Figure 7:
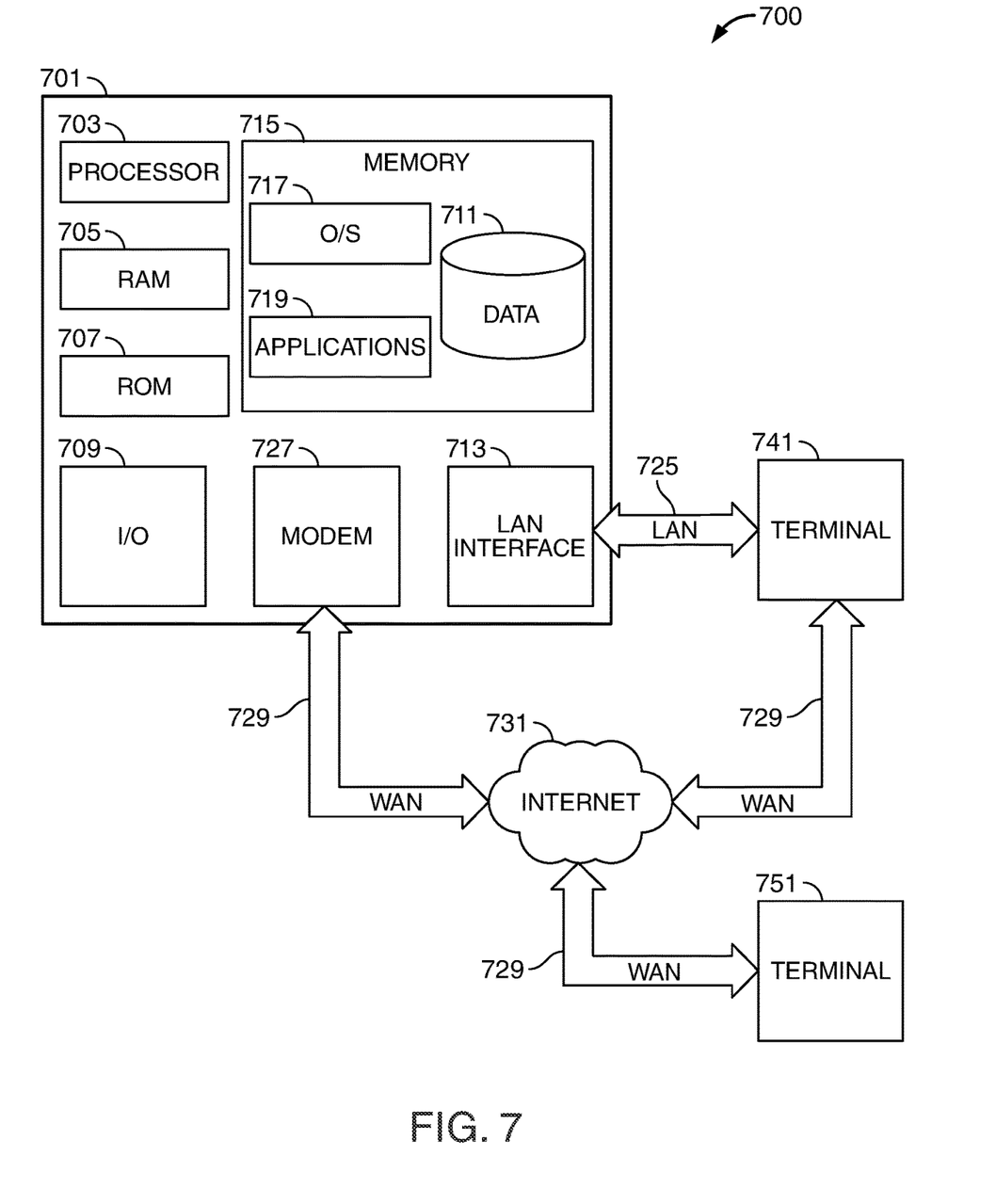
FIG. 7 shows an illustrative diagram in accordance with principles of the disclosure.

FIG. 7 shows an illustrative block diagram of system 700 that includes computer 701. Computer 701 may alternatively be referred to herein as a "server" or a "computing device." Computer 701 may be a workstation, desktop, laptop, tablet, smart phone, or any other suitable computing device. Elements of system 700, including computer 701, may be used to implement various aspects of the systems and methods disclosed herein.

Computer 701 may have a processor 703 for controlling the operation of the device and its associated components, and may include RAM 705, ROM 707, input/output module 709, and a memory 715. The processor 703 may also execute all software running on the computer—e.g., the operating system and/or voice recognition software. Other components commonly used for computers, such as EEPROM or Flash memory or any other suitable components, may also be part of the computer 701.

The memory 715 may comprise any suitable permanent storage technology—e.g., a hard drive. The memory 715 may store software including the operating system 717 and application(s) 719 along with any data 711 needed for the operation of the system 700. Memory 715 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 701 may execute the instructions embodied by the software to perform various functions.

Input/output ("I/O") module may include connectivity to a microphone, keyboard, touch screen, mouse, and/or stylus through which a user of computer 701 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 700 may be connected to other systems via a local area network (LAN) interface 713.

System 700 may operate in a networked environment supporting connections to one or more remote computers, such as terminals 741 and 751. Terminals 741 and 751 may be personal computers or servers that include many or all of the elements described above relative to system 700. The network connections depicted in FIG. 7 include a local area network (LAN) 725 and a wide area network (WAN) 729, but may also include other networks. When used in a LAN networking environment, computer 701 is connected to LAN 725 through a LAN interface or adapter 713. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking user functionality related to communication, such as e-mail, Short Message Service (SMS), and voice input and speech recognition applications. Application program(s) 719 (which may be alternatively referred to herein as "plugins," "applications," or "apps") may include computer executable instructions for invoking user functionality related to performing various tasks. The various tasks may be related to transaction pattern tracking and prediction.

Computer 701 and/or terminals 741 and 751 may also be devices including various other components, such as a battery, speaker, and/or antennas (not shown).

Terminal 751 and/or terminal 741 may be portable devices such as a laptop, cell phone, Blackberry™, tablet, smartphone, or any other suitable device for receiving, storing, transmitting and/or displaying relevant information. Terminals 751 and/or terminal 741 may be other devices. These devices may be identical to system 700 or different. The differences may be related to hardware components and/or software components.

Any information described above in connection with database 711, and any other suitable information, may be stored in memory 715. One or more of applications 719 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 8:
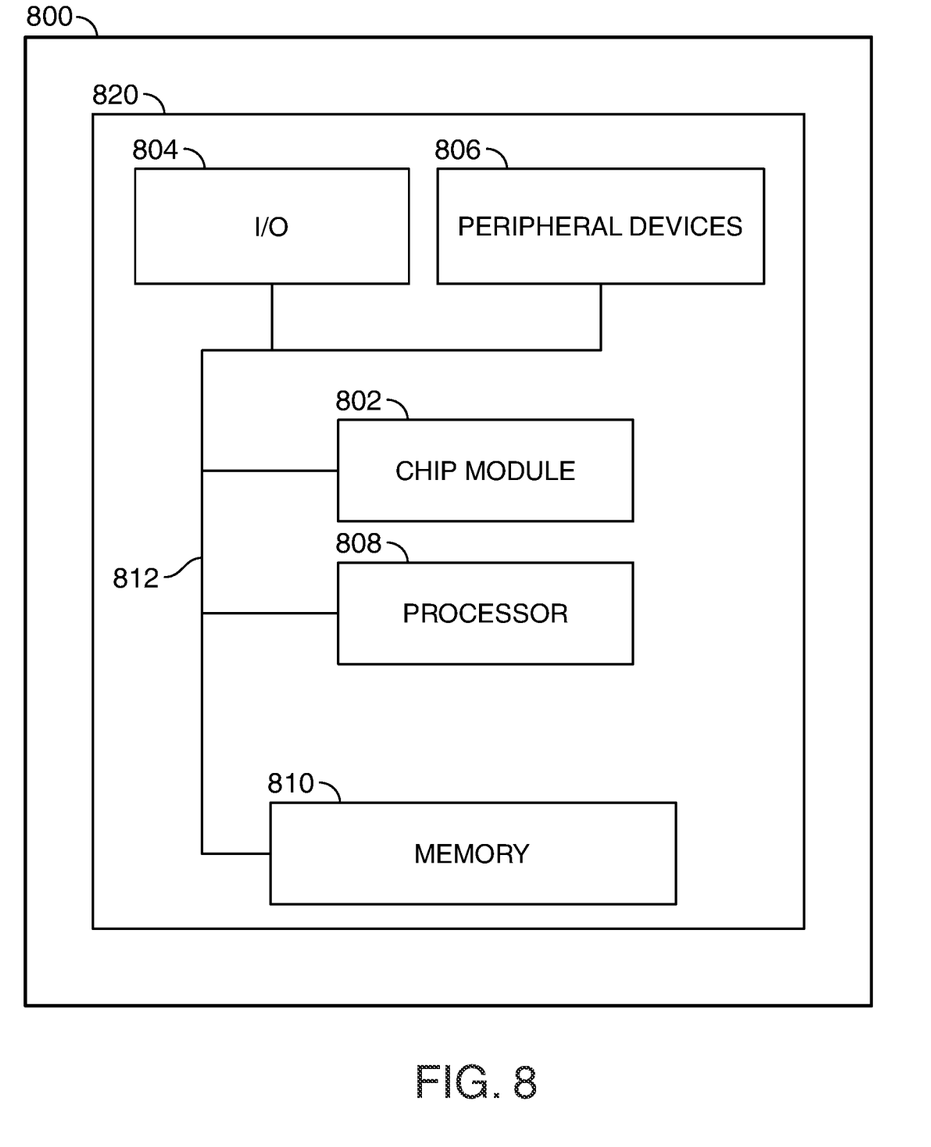
FIG. 8 shows another illustrative diagram in accordance with principles of the disclosure.

FIG. 8 shows illustrative apparatus 800 that may be configured in accordance with the principles of the disclosure. Apparatus 800 may be a computing machine. Apparatus 800 may include one or more features of the apparatus shown in FIG. 7. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions (which may be alternatively referred to herein as "computer instructions" or "computer code"), applications, signals, and/or any other suitable information or data structures.

Components 802, 804, 806, 808 and 810 may be coupled together by a system bus or other interconnections 812 and may be present on one or more circuit boards such as 820. In some embodiments, the components may be integrated into a single chip. The chip may be silicon-based.

Thus, systems and methods for selecting candidate data points for labeling. Persons skilled in the art will appreciate that the present invention can be practiced by other than the described embodiments, which are presented for purposes of illustration rather than of limitation. The present invention is limited only by the claims that follow.

What is claimed is:

1. A method for creating an auditable neural network, the method comprising:
    receiving, at the auditable neural network, a first unlabeled data point corresponding to a first set of activities;
    deconstructing, at the auditable neural network, the first unlabeled data point into a first plurality of data elements;
    reconstructing, at the auditable neural network, based on a simplicial structure, the first set of activities from the first plurality of data elements;
    executing, at the auditable neural network, a first reconstruction error algorithm, said first reconstruction error algorithm comparing the reconstructed first set of activities to the first set of activities;
    generating, at the auditable neural network, a first reconstruction error value based on the first reconstruction error algorithm;
    identifying, at the auditable neural network, that the first reconstruction error value is a higher than a threshold reconstruction error;
    upon identification that there is a higher than threshold reconstruction error with the first set of activities, quarantining, at the auditable neural network, the first data point for identification;
    receiving, at the auditable neural network, a first label for the first set of activities;
    creating, at the auditable neural network, a first neuron within the auditable neural network, said first neuron corresponding to the first set of activities, said first neuron being labeled with the first label;
    receiving, at the auditable neural network, a second unlabeled data point corresponding to a second set of activities;
    deconstructing, at the auditable neural network, the second unlabeled data point into a second plurality of data elements;
    reconstructing, at the auditable neural network, based on a simplicial structure, the second set of activities from the second plurality of data elements;
    executing, at the auditable neural network, a second reconstruction error algorithm, the second reconstruction error algorithm comparing the reconstructed second set of activities to the second set of activities;
    generating, at the auditable neural network, a second reconstruction error value based on the second reconstruction error algorithm;
    identifying, at the auditable neural network, that the second reconstruction error value is a higher than a threshold reconstruction error;
    upon identification that there is a higher than the threshold reconstruction error within the reconstructed second set of activities, quarantining the second data point for identification;
    receiving, at the auditable neural network, a second label for the second set of activities;
    creating, at the auditable neural network, a second neuron within the auditable neural network, said second neuron corresponding to the second set of activities, said second neuron being labeled with the second label;
    receiving, at the auditable neural network, a third unlabeled data point that corresponds to a third set of activities;
    using the auditable neural network to determine if the third unlabeled data point is labelable by the auditable neural network by:
        deconstructing the third unlabeled data point into its component parts using the simplicial structure;
        labeling the third unlabeled data point with a third label based on the component parts;
        reconstructing the third unlabeled data point from the component parts using the simplicial structure;
        calculating a third reconstruction error between the third unlabeled data point and the reconstructed third unlabeled data point; and
        quarantining the third unlabeled data point within the auditable neural network when the reconstruction error is greater than a predetermined threshold.

2. The method of claim 1, wherein the first label is either benign or malicious.

3. The method of claim 1, wherein the second label is either benign or malicious.

4. The method of claim 1, wherein the third label is either benign or malicious.

5. The method of claim 4, further comprising, when the third reconstruction error is less than the predetermined threshold and the third label is malicious, creating a neuron, within the auditable neural network, which corresponds to the third data point.

6. The method of claim 4, further comprising, when the third reconstruction error is less than the predetermined threshold and the third label is benign, completing processing the third data point at the auditable neural network.

7. The method of claim 4, further comprising, wherein when the third reconstruction error is greater than the predetermined threshold and the third label is malicious, creating a neuron, within the auditable neural network, which corresponds to the third data point.

8. The method of claim 1, wherein the first reconstruction error algorithm is calculated by $\sqrt{\Sigma_{i=1}^{N}\|y(i)-\check{y}(i)\|^2/N}$, where y(i) is each activity within the first set of activities, ў(i) is each activity within the reconstructed first set of activities and N is a number of activities within the first set of activities.

9. The method of claim 1, wherein each neuron within the auditable neural network is generated from a specific data point.

10. The method of claim 1, wherein the method further comprises:
predicting, using the auditable neural network, the first label for the first set of activities; and
using the first label in reconstructing the first set of activities.

11. The method of claim 1, wherein the method further comprises:
predicting, using the auditable neural network, the second label for the second set of activities; and
using the second label in reconstructing the second set of activities.

12. A method for candidate data points selection for labeling unlabeled data points, the method comprising:
inputting a first data point to an auditable neural network, the auditable neural network comprising a series of algorithms used to recognize underlying relationships in one or more data points through a plurality of weighted neurons arranged in a plurality of layers, each layer, included in the plurality of layers, comprising an activation function acting on a linear transformation of data points input into the network, where each neuron represents an inputted data point in terms of the inputted data point's independent and dependent variables;
predicting, using the auditable neural network, a label for the first data point;
deconstructing, based on a simplicial structure, the first data point into a plurality of component parts of the first data point;
reconstructing, the first data point into a reconstructed first data point, based on the simplicial structure, using the plurality of component parts and the label;
generating a reconstruction error value based on a reconstruction error algorithm that compares the first data point to the reconstructed first data point; and
quarantining the first data point within the auditable neural network when the reconstruction error value is above a threshold reconstruction error value.

13. The method of claim 12, wherein the reconstruction error algorithm is calculated by $\sqrt{\Sigma_{i=1}^{N}\|y(i)-\check{y}(i)\|^2/N}$, where y(i) is a component part within the first data point, y̌ (i) is a corresponding component part within the reconstructed first data point and N is a total number of component parts within the first data point.

14. The method of claim 12, further comprising:
transmitting the first data point from the auditable neural network to a labeling hardware processor coupled to a hardware memory;
receiving, at the auditable neural network from the labeling hardware processor, the first data point and a corresponding label;
generating, at the auditable neural network, a first neuron, said first neuron representing the first data point in terms of independent and dependent variables; and
utilizing, at the auditable neural network, the first neuron to predict labels for new inputted data points.

15. The method of claim 12, wherein the first data point is a financial account, the label is benign or malicious and the plurality of component parts are transactions.

16. The method of claim 12, further comprising processing the first data point within the auditable neural network when the reconstruction error value is below the threshold reconstruction error value.

17. A system for candidate data point selection for labeling unlabeled data points, the system comprising:
an auditable neural network residing on a hardware processor coupled to a hardware memory, the auditable neural network is operable to:
receive a first data point;
predict a label for the first data point;
deconstruct, based on a simplicial structure, the first data point into a plurality of component parts;
reconstruct the first data point into a reconstructed first data point based on the simplicial structure using the plurality of component parts and the label;
calculate a reconstruction error value based on a residual between the first data point and the reconstructed first data point; and
quarantine the first data point when the reconstruction error value is above a threshold reconstruction error value.

18. The system of claim 17, wherein the auditable neural network comprises a series of algorithms used to recognize underlying relationships in one or more data points through a plurality of weighted neurons arranged in a plurality of layers, each layer included in the plurality of layers comprising an activation function acting on a linear transformation of data points into the network, each neuron within the network represents an inputted data point in terms of the inputted data point's independent and dependent variables.

19. The system of claim 17, wherein the reconstruction error value is calculated using a root mean square algorithm.

20. The system of claim 17, wherein the reconstruction error value is calculated by $\sqrt{\Sigma_{i=1}^{N}\|y(i)-\check{y}(i)\|^2/N}$, where y(i) is a component part within the first data point, ў (i) is a corresponding component part within the reconstructed first data point and N is a total number of component parts within the first data point.

* * * * *